(12) United States Patent
Fischer et al.

(10) Patent No.: US 8,895,125 B2
(45) Date of Patent: Nov. 25, 2014

(54) MULTI-LAYER WOOD VENEER MOULDING

(75) Inventors: Christian Fischer, Lausanne (CH); Sebastien Lavanchy, Denges (CH); Thomas Wolf, Hochdorf (CH)

(73) Assignee: 3A Technology & Management Ltd., Neuhausen am Rheinfall (CH)

( * ) Notice: Subject to any disclaimer, the term of this patent is extended or adjusted under 35 U.S.C. 154(b) by 245 days.

(21) Appl. No.: 13/696,828

(22) PCT Filed: May 12, 2011

(86) PCT No.: PCT/EP2011/002351
§ 371 (c)(1),
(2), (4) Date: Nov. 8, 2012

(87) PCT Pub. No.: WO2011/141171
PCT Pub. Date: Nov. 17, 2011

(65) Prior Publication Data
US 2013/0065013 A1 Mar. 14, 2013

(30) Foreign Application Priority Data
May 12, 2010 (CH) ........................................ 0747/10

(51) Int. Cl.
| B32B 5/12 | (2006.01) |
| B27D 1/04 | (2006.01) |
| B27D 1/08 | (2006.01) |
| B32B 7/00 | (2006.01) |
| B32B 7/12 | (2006.01) |
| B32B 21/14 | (2006.01) |

(52) U.S. Cl.
CPC .. *B27D 1/04* (2013.01); *B27D 1/08* (2013.01); *B32B 7/005* (2013.01); *B32B 7/12* (2013.01); *B32B 21/14* (2013.01); *B32B 2255/08* (2013.01); *B32B 2255/26* (2013.01)
USPC ................................ 428/44; 428/50; 156/250

(58) Field of Classification Search
CPC ............. B32B 7/005; B32B 7/12; B27D 1/04
USPC ........................................ 428/44, 50; 156/250
See application file for complete search history.

(56) References Cited

U.S. PATENT DOCUMENTS

| 6,162,312 A | 12/2000 | Abney |
| 2009/0053452 A1 | 2/2009 | Takahashi |
| 2011/0064907 A1 | 3/2011 | Wolf |

FOREIGN PATENT DOCUMENTS

| AT | 507 249 A2 | 3/2010 |
| DE | 295 02 290 U1 | 3/1995 |
| WO | WO 2009/138197 A1 | 11/2009 |

OTHER PUBLICATIONS

International Search Report dated Jul. 26, 2011, PCT/EP2011/002351.

*Primary Examiner* — Alexander Thomas
(74) *Attorney, Agent, or Firm* — RatnerPrestia (57) ABSTRACT

Multi-layer moulding having a high structural load-carrying capacity with two opposing broad faces and a laterally peripheral end face, containing, in layers, broad face on broad face, layered wood veneers and, lying between the wood veneers, adhesives. The wood veneers are layered in such a way that the grain of at least one of the wood veneers deviates from the grain of one or the other wood veneers by 45° to 90° and in that the grain of the wood veneers deviates by 22.5 to 67.5° with respect to a surface normal to an end face of the moulding.

19 Claims, 5 Drawing Sheets

MULTI-LAYER WOOD VENEER MOULDING

CROSS-REFERENCE TO RELATED APPLICATIONS

This application is a U.S. National Phase Application of PCT International Application PCT/EP2011/002351, filed 12 May 2011 and published 17 Nov. 2011 in German as WO 20011/141171, which claims priority from Swiss Application No. 00747/10 filed 12 May 2010, which is incorporated herein by reference in its entirety for all purposes.

FIELD OF THE INVENTION

The invention relates to multi-layer mouldings with a high structural loading capacity according to the preamble of claim 1, its use and a method to produce it.

BACKGROUND OF THE RELATED ART

Cross-bonded veneers are known from the building sector as a component or structure, such as panels or beams, it being possible for the grains of all the veneer layers to run in the longitudinal direction in beams or a fifth of the veneers to be transversely bonded in beams or panels. For example, panels made of cross-bonded veneers have reduced moisture-dependent dimensional fluctuations in the transverse direction at a given strength, straightness and dimensional precision.

Blocks, for example made of stacked veneer boards which are glued together so as to be non-separable, are known from WO 2009/138197. The grain of the original wood trunk is inherently contained in the veneer boards and the veneer boards are layered with the grain oriented in the same direction to form the block. So-called cross-grained wood panels are separated from the block transverse to the grain and used further.

SUMMARY OF THE INVENTION

The invention is based on the object of describing multi-layer mouldings made of veneer boards, the mouldings having improved properties, in particular improved values, with regard to the shear modulus and the bending strength compared to identical bodies made of wood or wood layers, and proposing a method for the efficient production thereof. A further object consists in providing multi-layer mouldings made of veneer boards, which have a greater homogeneity compared to known wood layer laminates, in particular wood mouldings made of planks or scantlings.

DETAILED DESCRIPTION OF THE INVENTION

A moulding with the features of claim 1 leads to the achievement of the object according to the invention. Preferred embodiments are described in the dependent claims.

The wood veneers may be produced from any types of wood. Typical examples are fir trees, spruces, oak, beech or maplewood etc., also exotic woods, such as teakwood etc., and also bamboo. Particularly valuable mouldings according to the present invention are produced from balsa wood timbers or from wood products with balsa wood fractions. The veneers made of balsa wood are obtained from trunks, the wood of which, for example, has a density of 0.07 to 0.25 g/cm$^3$. Soft balsa wood has a density of 0.07 to 0.125 g/cm$^3$, medium hard balsa wood has a density of 0.125 to 0.175 g/cm$^3$ and hard balsa wood has a density of 0.175 to 0.25 g/cm$^3$. In technical application sectors, the low volume weight and the high compressive and tensile strength in the direction of the grain, which is unusual in relation to the low apparent density, are utilised. The moulded parts according to the invention have greatly increased stress properties in particular with regard to shear modulus and rigidity.

With regard to the grain in the moulding, at least one of the wood veneers should deviate by 60° to 90°, preferably by 75° to 90° and, in particular by 90°, from the grain of one or the other wood veneers. As a result, an anisotropy is created in the moulding, which allows the high shear modulus strength and very high bending strength properties in accordance with the object. In this case, the anisotropy is brought about by the different grain of adjacent wood veneers.

In particular, the grain of a wood veneer should deviate from the grain of the adjacent wood veneer or the adjacent wood veneers by 45° to 90°, expediently by 60° to 90°, preferably by 75° to 90° and, in particular by 90°.

The angle details in the present text always relate to a full circle of 360°.

The individual wood veneers are layered on top of one another in such a way that broad face comes to rest on broad face. In this case note is to be taken of the grain or the growth direction of the wood. The grains run in the direction of the growth of the tree, from which the wood veneer has been obtained.

It is expedient that the grain of at least one of the wood veneers deviates from the grain of one or the other wood veneers by 45° to 90° and that the grain of more than 50%, advantageously of 66% and more, and in particular all the wood veneers, deviates by 22.5 to 67.5° with respect to the direction of forces introduced in the moulding by way of the end faces. The forces are, in particular, introduced or guided away in the X-direction (X-direction in FIG. 1).

In a first example, a first wood veneer can be laid. A second wood veneer is laid on the broad face of the first wood veneer over the broad face thereof. The grain of the second wood veneer may deviate by 45 to 90° from the grain of the first wood veneer. A third wood veneer is deposited on the second wood veneer, the grain thereof deviating by 45 to 90° from the grain of the second wood veneer, the grain of the third wood veneer preferably corresponding to the grain of the first wood veneer. Accordingly, any desired number of wood veneers is layered to form a stack. The wood veneers are preferably layered alternately in the stack, so two directions of grains, which mutually enclose an angle of 45 to 90°, are present. In particular, the grain direction alternates from wood veneer to wood veneer.

In a second example, a first wood veneer can be laid. A second wood veneer is laid on the broad face of the first wood veneer over the broad face thereof. The grain of the second wood veneer may deviate by 45° from the grain of the first wood veneer. A third wood veneer is deposited on the second wood veneer, the grain thereof in turn deviating by 45° from the grain of the second wood veneer and the grain of the third wood veneer deviating by 90° from the grain of the first wood veneer. Accordingly, any number of wood veneers is layered to form the stack. The wood veneers are preferably layered alternately in the stack, so three directions of grains, which mutually enclose an angle of 45°, are present. In particular, the grain direction alternates from wood veneer to wood veneer.

The procedure is the same in a third example as in the first example, but instead of an individual first and/or second wood veneer in each case, groups of two, three, four or five wood veneers are used with a grain running in the same direction.

In a fourth example, the procedure is as in the second example, but instead of an individual first and/or second and/or third wood veneer, in each case, groups of 2, 3, 4 or 5 wood veneers are used with the grain running in the same direction.

Arrangements according to the first example are:

(I-)$_y$ (I-)$_y$ I

Arrangements according to the second example are:

(I/-)$_y$ (I/-)$_y$ I

Exemplary arrangements according to the third example are:

II-II-II

II-III-II

II--II--II

II--III--II

II--IIII--II (I-II-I)$_x$ (I--II--I)$_x$ (II--II--II)$_x$ (II--III--II)$_x$ (II--IIII--II)$_x$

Exemplary arrangements according to the fourth example are:

II/-II-/II

II/-/II/-/II

II/-/III/-/II

II//--II//--

II//--III--//II

II//--IIII--//II (I/-/II/-/I($_x$ (I/--II//--I)$_x$ (III///---)$_x$ wherein "I" in each case stands for a wood veneer with a grain in one direction, "-" in each case stands for a wood veneer with a grain rotated through, for example, 90° relative to "I" and "l" in each case stands for a wood veneer with a grain rotated through, for example 45° relative to "I" and "x" can signify a number from, for example, 1 to 50 and y can signify a number of, for example, 1 to 100.

In one procedure, wood veneers may be processed from tree trunks, for example by a tangential cut, in a veneer peeling machine into thin wood layers, accordingly into wood veneers in the form of veneer boards, wood sheets, peeled veneers or veneers. The wood layers, also called veneer boards, can be cut properly to the required or desired measurement.

Instead of veneers, the use of planks is also known from the prior art, in which planks which are processed on four sides, also called scantling timbers, generally being bonded to form blocks. As the wood density of the tree trunks varies sharply over their cross-section, but also over the tree length, corresponding blocks which are made of planks also have a very different density distribution. The planks are therefore frequently selected by a selection process, so only planks in one predetermined density range are used for one block. In comparison to the use of planks, veneers have a substantially more uniform density distribution. Therefore, the wood veneers used for the mouldings according to the invention have a substantially higher homogeneity compared to conventional planks, which is also shown in the following in the finished moulding made of the bonded wood veneer.

The length and width of the individual wood layers may, for example, be from 0.5 m to 2.5 m, expediently up to 1.8 m and advantageously up to 1.2 m. The thickness of a wood layer may be from 0.5 mm to 10 mm. The wood layers are generally subjected to a drying process and then further processed. The wood layers are, for example, coated with the provided quantity of adhesive on all sides or on one or both broad faces, by spraying on, sprinkling on, applying with slotted nozzles, rolling, brushing on or dusting. Sometimes an adhesive film may be inserted between the wood layers to glue the wood layers. The bonded wood layers may—sometimes mixed from fractions of varying density and/or wood quality—be layered to form a stack, broad face on broad face. The stack can be straightened by lateral pressure by rollers or cheeks. The adhesive may be activated by means of pressure on the stack and/or the action of temperature, but without an external action of pressure or action of temperature, with the adhesive being foamable, melting, reacting chemically etc. in accordance with the adhesive and the wood layers being mutually non-separably glued to form a moulding in block or panel form. The dimensions of the mouldings, which generally have the form of a panel, depend on the apparatus situation. The side edge lengths may, for example, be from 0.50 m to 1.80 m. For practical reasons, the length is, for example, from 0.60 m to 1.20 m. Panels, for example with a thickness of 2 cm to 30 cm, may, for example, be produced from 2 to 100 wood layers layered one above the other. The mouldings may be sawn in accordance with need or separated.

During processing, by lateral pressure by rollers or cheeks and vertical pressure by a belt, double belt or rollers, the pressure applied should be selected in such a way that the cell or grain structure of the wood, in particular during the processing of balsa wood, is not changed or damaged, in particular, that the density of the wood is not changed, or only slightly, by compression. The pressing power should be adjusted to be low, as with too high a pressing power, the wood structure as a whole is also compressed. The pressure applied between two rollers and/or belts may be 50 bar, expediently 0.5 to 5 bar.

Adhesives, such as physically setting adhesives or chemically curing adhesives, for example, may be used as the adhesive. Examples are one- or two-component polyurethane adhesives (PUR), one- or two-component epoxy resin adhesives, phenoplastics, such as phenol-formaldehyde adhesives, urea-containing glues, melamine-urea-phenol formaldehyde adhesives, isocyanate adhesive polyisocyanates, such as polymeric diphenylmethane diisocyanate, cyanoacrylate adhesives, acrylic resin adhesives, methyl methacrylate adhesive, hot glue, colophony, casein glue, in particular containing polyvinyl acetate, etc.

The wood layers or veneer boards may preferably be connected to one another with a casein glue, in particular a polyvinyl acetate-containing glue, a urea glue, a polyurethane-containing adhesive or a foaming polyurethane-containing adhesive.

Sometimes the adhesion can take place only in a dimensionally stable manner, i.e. without the application of an external pressure. A foaming polyurethane-containing adhesive may act both as an adhesive, and also as a filler between the wood layers or veneer boards. Preferred foaming adhesives, optionally foam adhesives are, inter alia, 2-component adhesives, thus also foaming adhesives, for example based on polyurethane or 1-component adhesives, also foaming adhesives, for example based on polyurethane and those which react under the influence of moisture. The moisture required for reaction may, for example, be provided by the wood moisture alone or by moistening the wood. The adhesives may also react, set or harden under the influence of heat. The adhesives may react, set or harden under pressure. Or, the adhesives may react, set or harden under the influence of heat and pressure. Adhesives are favourable which react, harden or set without heat, accordingly those which allow a cold hardening or so-called "cold curing". Adhesives are also favourable which react, set or harden without pressure applied from the outside. As mentioned above, by viscous behaviour of the adhesive or by the foaming process, the adhesive can arrive in the intermediate spaces or adhesive joints between the chips or on the mutual support faces, or adhesive joints, of the wood layers and partially, and advantageously completely, fill pores, gaps or cracks located in between. The object of the adhesive is to create a non-separable connection between the wood layers.

In order to avoid a compression of the wood veneers and to achieve a complete filling of the joints in rough veneer surfaces, in particular when using balsa wood as the veneer layer, the gluing of the veneer layers, i.e. the sandwich production, takes place particularly preferably with a foaming adhesive, substantially without pressure or with a slight pressure of less than 1.0 bar, in particular a pressure of between 0.3 and 1.0 bar. The aim of this method step is to achieve a minimal moulding density, simultaneously with inner strength properties that are as homogeneous as possible and minimal penetration of resin during the infusion process (loading the balsa wood veneers with adhesive).

The mouldings contain a wood and an adhesive fraction. The wood fraction of a moulding may, for example, be from 60 to 99% by volume. The adhesive is advantageously present in fractions of 1 to 40% by volume. The adhesive is generally present in fractions of 1 to 15% by volume, expediently 2 to 10% by volume and preferably 3 to 5% by volume, based on the volume of the moulding.

Mouldings are advantageous in which the fully reacted adhesive has the density of the surrounding wood or a 0 to 20% by weight, preferably 0 to 10% by weight, higher or lower density, than that of the surrounding wood. The fully reacted, such as set or foamed etc., adhesive may have densities or bulk densities from 50 kg/m$^3$ to 300 kg/m$^3$. In particular foamed adhesives advantageously have a bulk density of 50 kg/m$^3$ to 240 kg/m$^3$.

The preferred wood veneers are balsa wood veneers. As balsa wood is a natural product, depending on the type of plant, location or due to the influences of growth etc., it has different densities or bulk densities. In the present case, timbers with densities of about 80 to 240 kg/m$^3$ are preferably selected. With regard to the mouldings according to the present invention in practical application, a bulk density of, for example, less than 200 kg/m$^3$ is advantageous. Favourable bulk densities are 100 to 200 kg/m$^3$, and the bulk densities are advantageously 120 to 180 kg/m$^3$ and, in particular, 160 kg/m$^3$.

Panels are preferably produced from a moulding according to the invention, with the separating or sawing direction running transverse to the broad face, i.e. parallel to an end face. The grain of the individual wood veneers preferably encloses, with the surface normal to the panel, an angle of 22.5 to 45°, in particular about 45°. Quite particularly preferably, the grain, averaged over all the glued wood veneers, runs substantially perpendicular to the panel plane.

The panels are preferably suitable for a tensile or compressive stress perpendicular to the panel plane. The panel is further preferably suited to a shear or bending stress in the panel plane, the shear stress running, in particular, transverse to the averaged grain.

The present invention also relates to a method for producing the multi-layer mouldings having a high structural loading capacity, from veneers, or wood layers, the mouldings having two opposing broad faces and a laterally peripheral end face and the mouldings containing wood veneers placed in layers in accordance with the broad faces and adhesives lying between the wood veneers. According to the method, the wood veneers are coated with adhesive, the coated wood veneers are oriented with respect to the grain and stacked, the grain of at least one of the individual wood veneers deviating by 45 to 90° from the grain of one or the other wood veneers, the adhesive being activated and, with the formation of a holding force being solidified by cold hardening, without pressure or under the influence of heat and/or pressure, to form the moulding.

A preferred method for producing the mouldings consists in that the wood veneers are coated with the adhesive, oriented with respect to the grain and layered or stacked on top of one another so the grain of the individual wood veneer deviates from the grain of the wood veneer located next thereon by 60° to 90°, preferably by 75 to 90° and, in particular, by 90° from the direction of the grain.

The individual wood veneers are limited with respect to their dimensions by the length and the thickness of the peeled trunk. The grain lies obliquely or diagonally with respect to the body length and width in the mouldings. Cutting out portions from the wood veneer with the aim of achieving an oblique grain in the moulding would lead to large losses of wood veneer. Therefore, it may prove to be advantageous to divide the wood veneers obtained diagonally or obliquely into portions and to join the portions again by means of the end edges. Joining by connecting along the end edges may take place by means of gluing. For example, approximately square wood veneers can be divided diagonally into triangular portions. In each case, four of the portions are joined again by means of the end faces, which form the catheti. A square wood veneer is produced again, but with a diagonally running grain.

The moulding described can now be further used as such. The mouldings are, for example, panels, beams, planks or blocks, which can be used as such or can be further processed by machining such as cutting, machining or material-removing machining into struts, supports, carriers, bases, insert parts, structural parts, parts of multi-layer materials or composite materials etc. For example, mouldings with an end edge length, a width and height of 0.6 to 1.8 m in each case, advantageously from 0.6 to 1.2 m in each case, can be produced and used directly or optionally further processed.

The mouldings have two broad sides and a peripheral end face. The end face may have corners, edges or rounded areas. A force which is introduced into a moulding according to the invention, in particular, must run in the wood layers directed in the same direction and is expediently introduced or guided away by way of the end faces. Any fastening means introduce the force advantageously into the moulding in such a way that the load runs in the same direction in the wood layers. With regard to the direction of the forces which are introduced into or guided away from the moulding by way of the end faces by way of the fastening means, the grain of the wood layers, or the wood veneers, deviates by 22.5 to 67.5°. The grain of the wood layers, or wood veneers, preferably deviates by 45°.

Using the mouldings and, in this case, in particular panels, obtained according to the invention, for example by the application, on one or both sides, on the broad faces and/or on the end faces of plastics material panels, layers or films, of plastics material panels or layers reinforced with textile fibres, glass fibres, plastics material fibres or carbon fibres, metal panels or sheets, wood panels, woven fabrics, knitted fabrics, hosiery-type fabrics, nonwovens, of woven fabrics, knitted fabrics, hosiery-type fabrics, nonwovens impregnated with synthetic resins, with plastics material or metal foils etc, composite materials that are still more highly loadable or materials with extended functional properties can be created.

Mouldings according to the invention can be divided in another form of application into panels of any desired thickness, such as into thicknesses of 3 to 300 mm, preferably from 8 to 100 mm. The mouldings can be cut for this purpose by horizontal cutting or sawing, for example by means of a band saw, into panels. The grain in the wood veneers extends over the height in panels of this type. The grain of each wood veneer reaches the upper and lower side obliquely. The grain extends obliquely with respect to the side edges over the side faces. Sometimes, individual wood veneers or a number of wood veneers in a moulding may run parallel to the side edges and accordingly project perpendicularly from the lower or upper side. A cover layer made, for example, of a metal foil, a metal band or a metal plate made of reinforced, such as fibre-reinforced, or non-reinforced plastics material films or panels, made of paper, cardboard or wood elements, such as planks or veneers, glass, ceramic, stone etc. may now be attached, for example glued or laminated onto the upper and/or lower side of the panel, accordingly representing an improved cross-grained wood panel, over the entire surface or part of the surface. The panels may also be laid in hollow spaces or glued in or can be moulded in a plastics material matrix. In these applications, the panels are used for the structural reinforcement of mechanically highly loaded, but light-weight, devices. Such devices may be blades of wind turbines or propellers.

The panels are preferably produced by sawing or other separation of a moulding according to the invention transverse to the broad face, i.e. parallel to an end face. In this case, the grain of the individual wood veneers preferably encloses an angle of 22.5 to 45°, in particular about 45°, with the surface normal to the panel. As a result, the panels are used in the sense of an end grain wood panel (end grain panel), the panel surface, in contrast to conventional end grain wood or cross-grained wood panels not crossing the grain of the wood veneers which are contained in the moulding, but intersecting at an angle different from a right angle. Quite preferably, the grain of adjacent wood veneers intersects the panel surface symmetrically, i.e. the acute angle between the grain of adjacent wood veneers and the panel surface is substantially the same in terms of amount. The end grain wood panels according to the invention differ substantially from conventional plywood panels (flat grain plywood panels), in which the grain of all the veneer layers lies substantially parallel and also parallel to the panel surfaces.

More preferably, veneer layers with only two different grains are used, the veneer layers with a different grain being used alternately in order to achieve as high a homogeneity of the moulding properties as possible.

The mouldings according to the invention can be used in many ways. For example, they are the starting products or finished products in the area of highly loadable built-in parts in the transport area, for example for aircraft, railways, lorries, buses, ships or in automotive engineering or in constructions, such as bridges, bridge supports, bridge surfaces that can be driven or walked over. These may in particular be built-in parts, which are under a high load, such as a high shear modulus and/or tensile stress or which are intermittently highly loaded with regard to shear and/or tensile stress. In this case, the tensile or compressive loading takes place perpendicular to the panel plane or perpendicular to the end face of the moulding, or a shear loading takes place in the panel plane or in the plane of two opposing end faces of the moulding. The mouldings may, for example, be used per se, but also as a core material, as a layer material or as composite materials, as a composite or in a composite, in transporting means, such as in boats, ships, buses, lorries, railway vehicles etc., as ceilings, bases, intermediate bases, wall panellings, covers etc. When using, for example, balsa wood, because of the low density, the mouldings according to the invention may be used as a replacement for conventional light construction materials, for example as carriers, struts, supports, profiles, panels etc. and as core materials in multi-layer materials. Further applications of the mouldings or panels made therefrom are filling, insertion or reinforcement bodies in vanes of wind turbines or as propellers or in propellers of flow generating devices for fluids, such as gases or liquids.

The present invention is illustrated by way of example with the aid of FIGS. 1 to 6.

Figure 1:
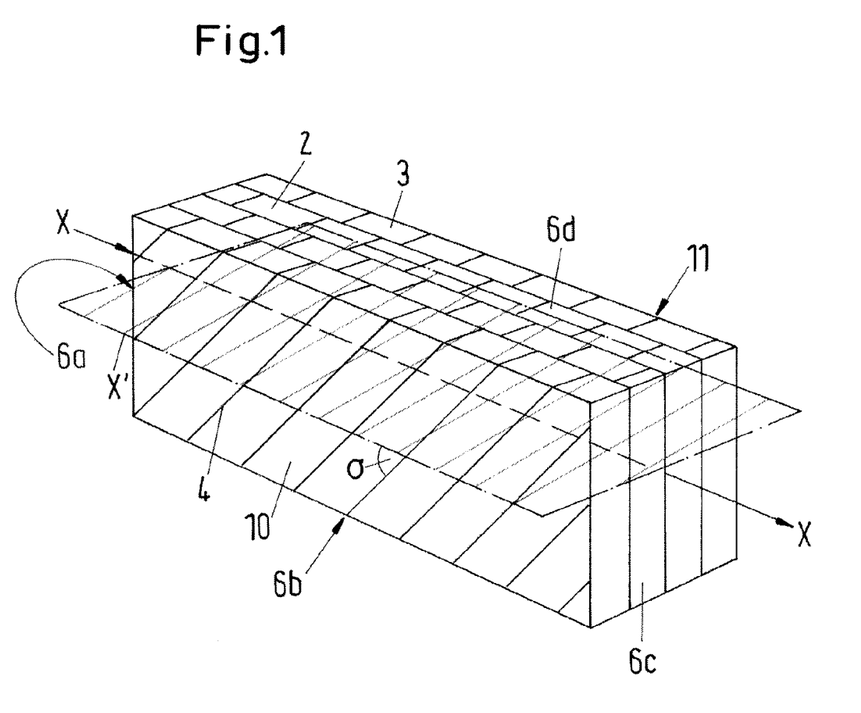
FIG. 1 shows a view of a moulding.

FIG. 1 shows the view of a moulding.

Figure 2:
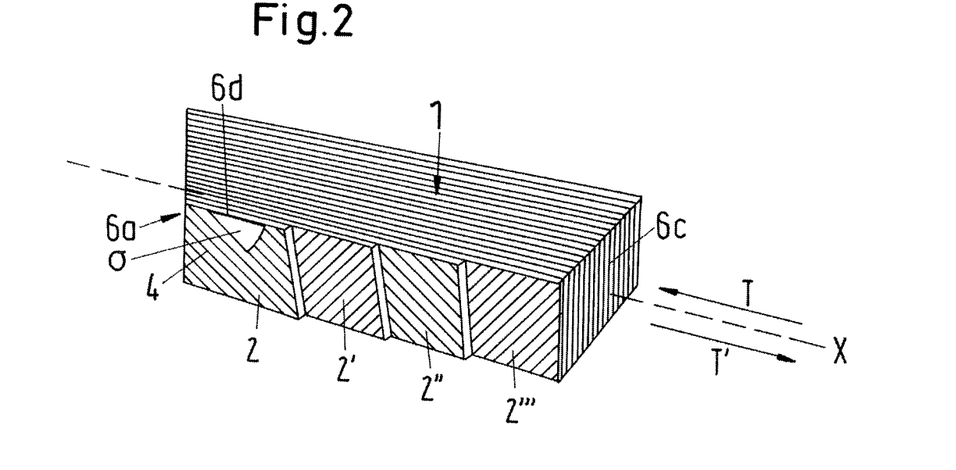
FIG. 2 shows a schematic sketch of a moulding.

FIG. 2 shows a schematic sketch of a moulding.

Figure 3:
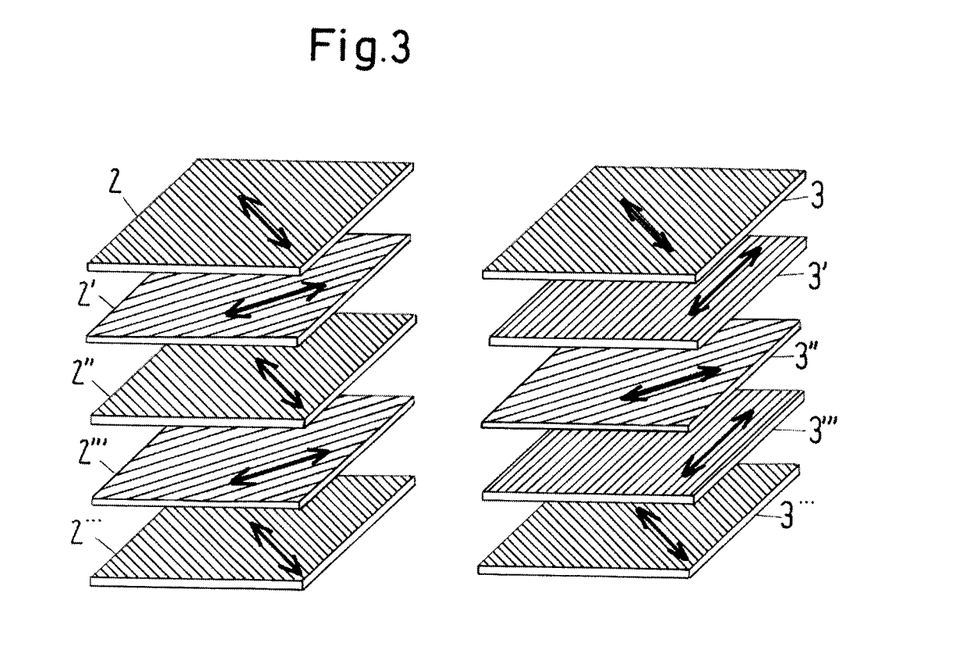
FIG. 3 shows examples of layerings with the aid of two mouldings.

FIG. 3 shows examples of layerings with the aid of two mouldings.

Figure 4:
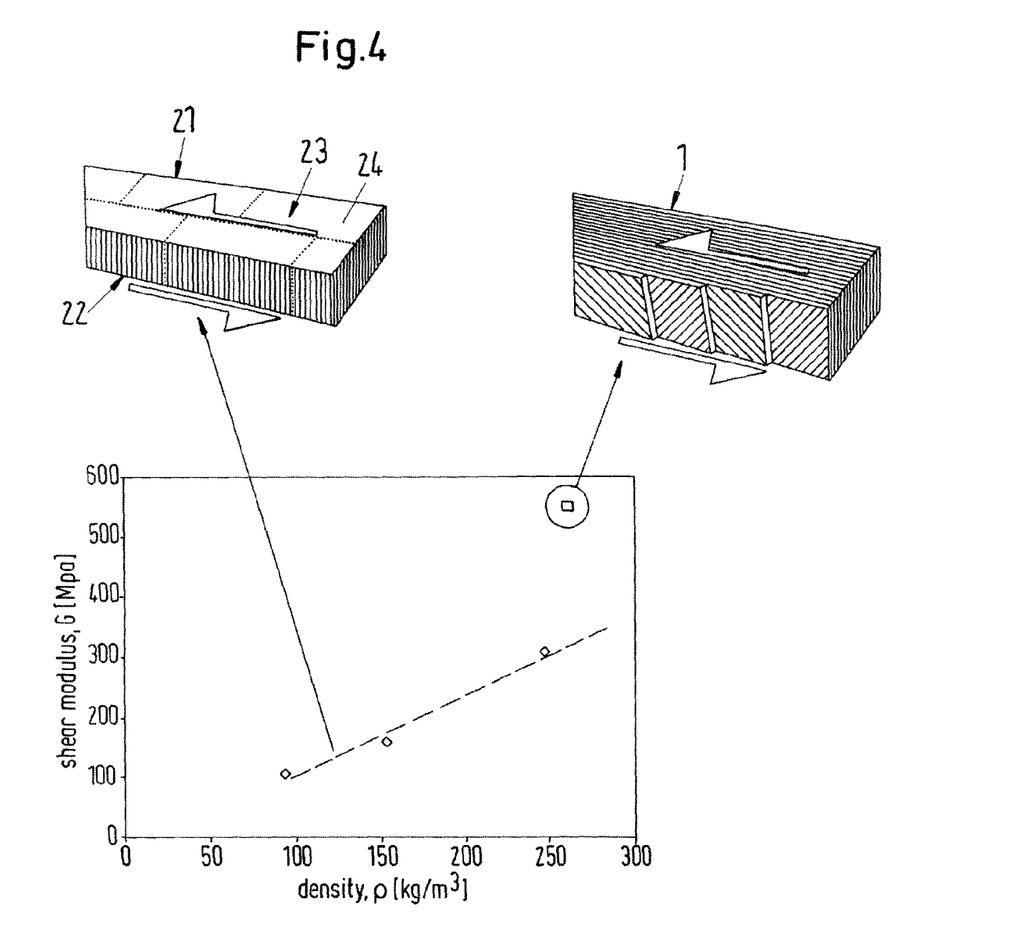
FIG. 4 shows an increase in shear modulus realized in a moulding.

FIG. 4 shows the increase in the shear modulus realised in a moulding according to the invention.

Figure 5:
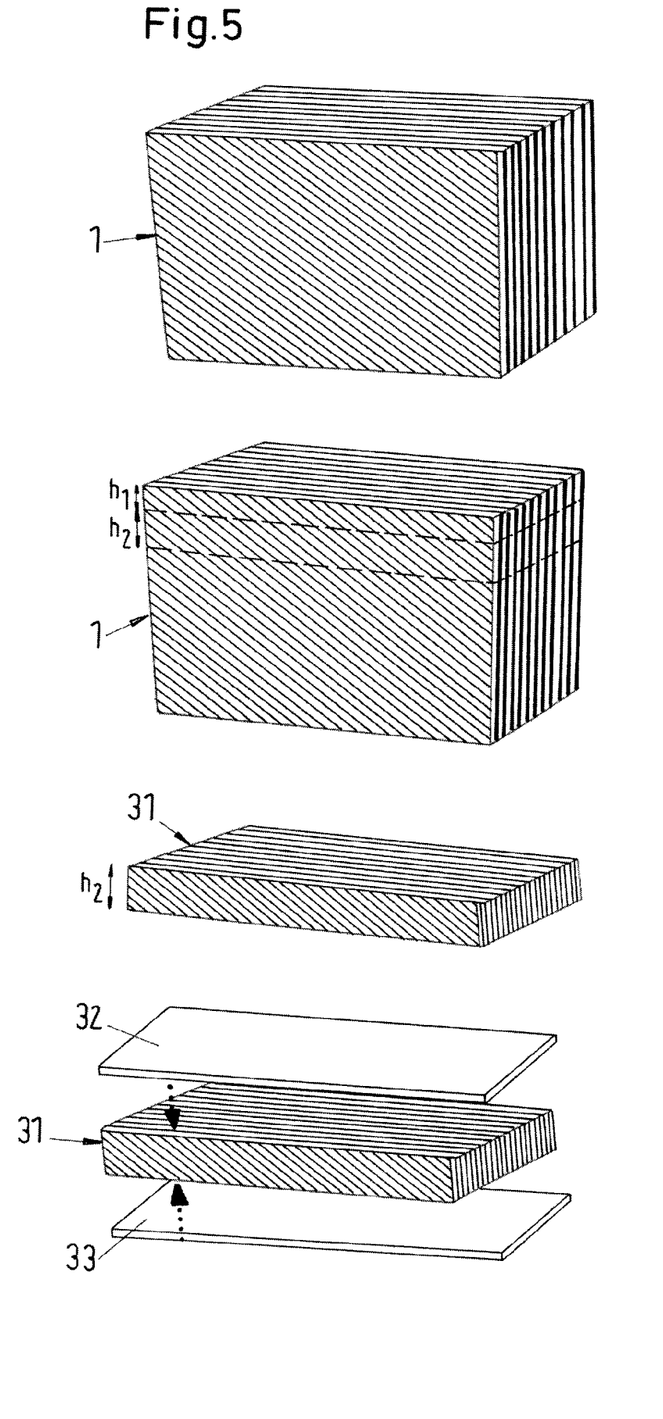
FIG. 5 shows a possible further processing of mouldings.

FIG. 5 shows a possible further processing of the mouldings according to the invention.

Figure 6:
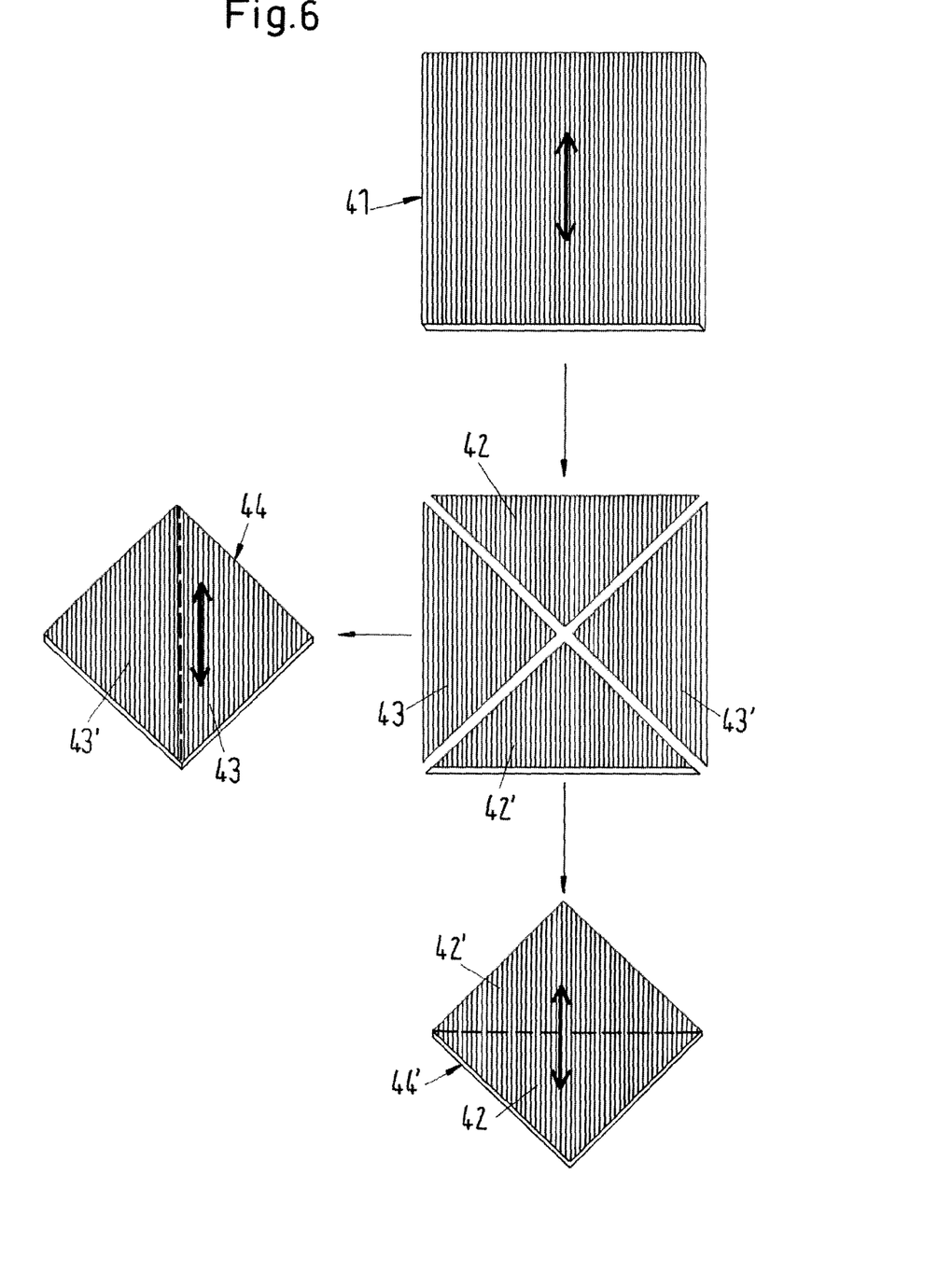
FIG. 6 shows a variant for efficient production of wood veneers to produce mouldings.

FIG. 6 shows a variant for efficient production of wood veneers to produce the present mouldings.

A moulding 1 in FIG. 1, for example shown in cuboid shape, has broad faces 10, 11 and a peripheral end face 6. The end face 6 is divided through the cuboid shape into four portions 6a, 6b, 6c, and 6d. The moulding is formed by stacked and mutually glued wood veneers 2, 3 etc. The individual wood veneers have one direction of the grain. According to the present invention, the grain of at least one of the wood veneers deviates from the grain of one or the other wood veneers by 45° to 90° and the grain of at least one part of the wood veneers deviates by 22.5 to 67.5° with respect to the plane X' running through the moulding (circled by dash-dot lines and indicated by fine hatching), the forces introduced or guided away running in the direction of the axis X. The direction of the grain deviates, as shown by way of example in this case, between two adjacent wood veneers by 90° in each case. The angle σ, i.e. the angle between the plane X' and the grain, may be from 22.5° to 67.5°. An axis X indicated by an arrow and a finely hatched plane X', run through the moulding. With regard to the plane X', the grain drawn in of all the wood veneers deviates by 45°, by way of example. To achieve optimal load values in the moulding, the forces introduced or guided away act, in particular, in the X-direction. The forces are in particular introduced or guided away by way of the, or in the direction of, the end faces 6a and 6c.

In the part of a moulding 1 shown in FIG. 2, made of a large number of wood veneers, for clarity and illustration of the grains, the first three wood veneers 2, 2', 2" are drawn receding slightly relative to the respective wood veneer 2', 2", 2''' located therebelow. The wood veneers 2, 2', 2", 2''' etc. are stacked on top of one another over their broad faces. The adhesive connections, which are not specially indicated, are located therebetween and connect the wood veneers non-separably to one another. The respective hatching on each wood veneer 2, 2', 2", 2'" shows the respective grain 4. The angle σ enclosed between the grain 4 and end face 6d in the wood veneer 2 is designated σ. For example, the end face 6d runs parallel here to an imaginary plane X'. The angle σ may be from 22.5° to 67.5°. An angle of 45° is depicted by way of example. The wood veneer 2' located below it has a grain, which is arranged rotated by way of example through 90° from the grain of the wood veneer 2. If a force T or T' is now introduced or guided away in the arrow direction, for example by way of the end faces 6a, 6c into or from the moulding 1, the moulding 1 in the arrow direction T or T' shows an increase in the maximum shear modulus compared to the introduction of the same force into a comparative moulding with a grain running only in the arrow direction T, T' or perpendicular to T, T', up to the failure of the moulding 1 in accordance with the values in FIG. 5.

FIG. 3 shows a section of a moulding, the individual wood veneers being shown drawn apart and separated from one another in the sense of an exploded drawing. The adhesive which is arranged between the wood veneers is not drawn. In FIG. 3a, the wood veneers 2 and 2' are rotated with respect to one another, for example through 90°, with respect to their grain. The grain can be seen schematically in each case as hatching and is illustrated by the solidly drawn arrows. The grain of the wood veneer 2" is in turn rotated through 90° relative to the grain of the wood veneer 2'". The wood veneers 2· ·. etc. thus alternate accordingly until the desired stack height is reached. The layer sequence $(I-)_y$ is shown. In FIG. 3b), the wood veneers 3 and 3' are rotated with respect to one another by 45°, by way of example, with respect to their grain. The grain of the wood veneer 3" is in turn rotated by 45° relative to the grain of the wood veneer 2'". Thus, the wood veneers 3· ·. etc. alternate accordingly until the desired stack height is reached. The layer sequence $(I/-)_y$ is shown.

FIG. 4 shows the shear modulus values for different mouldings. The body shown is a cross-grained panel 21. Cross-grained panels 21 belong to the prior art. For example, trunk portions with a polygonal, in particular right angled cross section, are produced starting from a balsa wood trunk, by sawing in the growth direction of trunks of balsa wood trees. The trunk portions can be processed by further sawing process, this time transverse to the grain, to an approximately uniform length to form the balsa wood scantlings. The balsa wood scantlings may be glued to one another on their narrow faces, i.e. along the grain, to form blocks. Arrow 24 indicates a balsa wood scantling of this type. The dotted lines are the glued seams. The cross-grained panels 21 can be separated from the blocks transverse to the grain by sawing. The entire grain extends in the cross-grained panel 21 perpendicularly from the downwardly pointing limit face 22 to the upwardly pointing limit face 23. The moulding 1 according to the invention from FIG. 2 shows wood veneers that have partially been exposed in the drawing to demonstrate the grains. The grains are visible at the exposed faces. The solidly drawn arrows on and below the bodies in each case show the direction of the introduced forces. In the "shear modulus" graph, three values of the shear modulus are plotted against the density of the cross-grained wood panel 21. The three measured values are connected by a dashed line. The measured shear modulus value for the moulding 1 according to the invention is also plotted in the graph. It can clearly be seen that the value for the shear modulus for the moulding 1 according to the invention is clearly above the line of the values for the cross-grained wood panel 21. The rise in the value measured for the moulding 1 for the shear modulus is 75% above a comparative value for the cross-grained wood panel 21 according to the prior art.

FIG. 5 shows a development of the moulding 1 according to the invention. The moulding is divided by horizontal cuts into panels of any height, for example shown as height $h_1$ and $h_2$. A panel 31 is produced, shown as an example here, with the height $h_2$. The panel 31 can now be covered on one or both sides with respect to its upper and/or lower side with cover layers 32, 33. Examples of cover layers are panels or sheets made of metal, such as, for example, aluminium, panels made of plastics materials or of fibre-reinforced plastics materials, with wood, such as planks, etc. The cover layers 32 and/or 33 are generally glued to the panel 31. For this purpose, the cover layers 32 and/or 33 are guided in the arrow direction against the panel 31 and, for example, glued by means of an adhesive or an adhesive film (not shown), sometimes with heating and/or pressure, until the adhesive has set.

FIG. 6 shows by way of example a possible production of the individual wood veneers. As the wood veneers are limited with respect to their dimensions by the length and the thickness of the peeled trunk and the grain is to be present in the mouldings diagonally or obliquely with respect to the body length and width, merely cutting portions out of the wood veneer would lead to large losses of wood veneer. Therefore, the wood veneer 41 obtained from the trunks can be divided diagonally or obliquely into portions 42, 42', 43, 43', such as sawn or cut, and the portions 42, 42', or 43, 43' joined again along the end edges. A joining by connection along the end edges may, for example, take place by gluing. For example, approximately square wood veneers 41 may be divided diagonally into triangular portions 42, 42', 43, 43'. Two of the triangular portions 42, 42', or 43, 43' are in each case joined again by the end faces which form the hypotenuse. A square wood veneer 44, 44' is produced again, but with a diagonally running grain. The solid arrows in the figures in each case indicate the grain.

The invention claimed is:

1. An end grain wood panel separated from a multi-layer moulding in block or panel form having a high structural loadability with two opposing broad faces and a laterally peripheral end face, containing, in layers, broad face on broad face, layered balsa wood veneers and adhesives lying between the balsa wood veneers, the end grain wood panel being separated transverse to the broad faces of the moulding, and the grain of the end grain wood panel averaged over all the glued balsa wood veneers running substantially perpendicular to the panel plane, wherein the grain of at least one of the balsa wood veneers deviates from the grain of one or the other balsa wood veneers by 45° to 90°, and wherein the grain of at least a part of the balsa wood veneers deviates by 22.5 to 67.5° with respect to a surface normal to an end face of the moulding.

2. An end grain wood panel according to claim 1, wherein the balsa wood veneers are produced by a tangential cut in a veneer peeling machine from balsa wood trunks.

3. An end grain wood panel according to claim 1, wherein the grain of at least one of the balsa wood veneers deviates by 60° to 90° from the grain of one or the other balsa wood veneers.

4. An end grain wood panel according to claim 1, wherein the grain of a balsa wood veneer deviates from the grain of the adjacent balsa wood veneer or the adjacent balsa wood veneers by 45° to 90°.

5. An grain wood panel according to claim 1, wherein the grain of the balsa wood veneers, with a surface normal to the end grain wood panel, encloses an angle of 22.5 to 45°.

6. An end grain wood panel according to claim 1, wherein the adhesives are foamed adhesives.

7. An grain wood panel according to claim 1, wherein the adhesives are contained in quantities of 1 to 15% by volume, based on the volume of the moulding.

8. An end grain wood panel according to claim 1, wherein the adhesive, when fully reacted, set or foamed, has a density of 50 kg/m$^3$ to 300 kg/m$^3$.

9. An end grain wood panel according to claim 1, wherein the fully reacted adhesive has a 0 to 20% by weight higher or lower density than that of the surrounding wood.

10. An end grain wood panel according to claim 1, wherein the grain of at least one of the balsa wood veneers deviates by 75° to 90° from the grain of one or the other balsa wood veneers.

11. An end grain wood panel according to claim 1, wherein the grain of at least one of the balsa wood veneers deviates by 90° from the grain of one or the other balsa wood veneers.

12. An end grain wood panel according to claim 1, wherein the grain of a balsa wood veneer deviates from the grain of the adjacent balsa wood veneer or the adjacent balsa wood veneers by 75° to 90°.

13. An end grain wood panel according to claim 1, wherein the grain of a balsa wood veneer deviates from the grain of the adjacent balsa wood veneer or the adjacent balsa wood veneers by 90°.

14. An end grain wood panel according to claim 1, wherein the grain of the balsa wood veneers, with a surface normal to the end grain wood panel, encloses an angle of about 45° C.

15. An end grain wood panel according to claim 1, wherein the adhesives are foamed polyurethane adhesives having densities of 50 kg/m$^3$ to 240 kg/m$^3$, the adhesives are contained in quantities of 3 to 5° by volume based on the volume of the moulding, and the fully reacted adhesives have a density of 0 to 10% by weight higher or lower than that of the surrounding wood.

16. A method for producing an end grain wood panel according to claim 1, wherein balsa wood veneers are coated with adhesive, the coated balsa wood veneers, oriented with respect to the grain, are stacked, the grain of at least one individual balsa wood veneer deviating by 45 to 90° from the grain of the adjacent wood veneer, the adhesive is activated and solidified with the formation of a holding force, without pressure or under the influence of heat and/or pressure to form the moulding, and the moulding is sawn or otherwise separated transverse to the broad face to form a number of end grain wood panels.

17. A method according to claim 16, wherein a foaming adhesive is used and the activation and solidification of the adhesive takes place substantially without pressure or under a low pressure of less than 1 bar.

18. A method according to claim 16, wherein the balsa wood veneers are coated with adhesive, oriented with respect to the grain and stacked in such a way that the grain of each individual balsa wood veneer deviates by 45 to 90° from the direction of the grain of the, or of the closest, balsa wood veneers.

19. A method according to claim 16, wherein the separation of the moulding into end grain wood panels takes place in such a way that the grain of the individual balsa wood veneers encloses an angle of 22.5 to 45° with the surface normal to the end grain wood panel.

* * * * *